Patented May 25, 1937

2,081,519

UNITED STATES PATENT OFFICE 2,081,519

METHOD OF SEPARATING WAX FROM OIL

Maner L. Wade, Long Beach, Calif., assignor to Union Oil Company of California, Los Angeles, Calif., a corporation of California No Drawing. Application August 6, 1935,
Serial No. 34,921

11 Claims. (Cl. 196—19)

This invention relates to a process for the separation of wax from oil. More particularly this invention relates to a process in which a substance is added to a wax-containing oil to condition the oil so that the wax may be more readily separated from the oil.

In the art of separating wax from oil it has been found that materials such as asphalt, cracked petroleum residues, cracked distillates, extracts obtained from petroleum fractions, esters, gums, waxes and certain condensation products produced from aromatic and aliphatic hydrocarbons aid in the separation of wax from oil.

I have discovered that mixtures of the aforementioned materials are more effective as wax separation aids than the individual materials.

It is therefore an object of this invention to condition oil for the separation of wax by adding thereto a mixture of materials which is more effective in aiding the separation of wax from oil than the individual materials comprising the mixture.

It is a further object of this invention to produce wax separation aids comprising mixtures of materials or substances which individually are not as effective in aiding the separation of wax from oil as said mixture.

In carrying out the process according to this invention, a small amount of the wax separation aid is added to a waxy oil and the oil is chilled to a temperature sufficiently low to precipitate or separate the wax. The cooled mass is then settled, centrifuged or filtered to remove the precipitated wax from the oil.

If desired, the waxy oil may be diluted with a solvent such as acetone and benzol, trichlorethylene, dichlorethylene, naphtha, gasoline, gas oil, or a liquefied normally gaseous hydrocarbon such as ethane, propane or butane, or mixtures thereof, in order that the wax may be more readily separated from the chilled mass.

The materials which I may employ as wax separation aids are mixtures of the substances shown in Table I with the substances shown in Table II.

Table I

1. Condensation products.
2. Olefines condensed with aromatics or naphthenes, or substituted aromatics or substituted naphthenes by means of aluminum chloride.
3. Polymerization products.
4. Cracked petroleum pitch.
5. Naphtha extracts obtained from cracked petroleum pitch.
6. Extract produced by extracting cracked pitch with lubricating oil.
7. Distillates produced from cracked petroleum residues or pitches.
8. Extract produced by extracting wax with acetone.

Table II

1. Montan wax.
2. I. G. E. wax.
3. I. G. S. wax.
4. I. G. B. wax.
5. I. G. O. P. wax.
6. Carnauba wax.
7. Stearic acid.
8. Oleic acid.
9. Naphthenic acid.
10. Aluminum stearate.
11. Aluminum naphthenate.
12. Aluminum oleate.
13. Partially oxidized paraffin wax.
14. Partially oxidized hydrocarbons.
15. Natural resins such as gums, paracumarone, gum damar and copal.
16. Wax tailings.

The following is a detailed description of the materials shown in Table I:

The condensation products, Item 1 of Table I, are produced by condensing chlorinated heavy hydrocarbons such as paraffin wax, petrolatum or other aliphatic hydrocarbons, with an aromatic compound such as naphthalene, anthracene or aromatic hydrocarbons in the presence of aluminum chloride. As a specific example of a method of producing these condensation products, paraffin wax having a melting point of about 125° F. is chlorinated by the direct addition of chlorine in the presence of a small quantity of iodine and at a temperature of about 200° F. for a period of about 24 hours. To 90 parts of this chlorinated paraffin 10 parts of naphthalene and 10 parts of aluminum chloride are then added with a sufficient quantity of kerosene to completely dissolve the organic materials. The reaction between the components of the mixture proceeds at about 75° F. and at the end of 24 hours is substantially complete. At the end of this period the temperature will have raised to about 200° F. The aluminous sludge is then allowed to settle and the liquid oil is withdrawn and distilled to remove the kerosene and the unreacted paraffin as distillates. The heavy oil remaining after the distillation is a typical condensation product which I may employ according to this invention. The method of producing the above condensation product is fully described in the United States Patent No. 1,815,022 to Garland B. Davis.

Another example of producing the condensation products included in Item 1, of Table I is as follows:

100 parts of chlorinated wax are mixed with 10 parts of naphthalene. This mixture is heated to 130–140° F. To the heated mixture 10 parts of aluminum chloride are slowly added with constant agitation of the mass. This mass is kept at a temperature of 130–140° F. for 1 to 4 hours. The mixture is then mixed with an extracting liquid such as carbon tetrachloride, chloroform or tetrachlorethane which facilitates in the separation of the sludge. The extract is neutralized and washed to remove undesirable chlorine compounds and is then distilled to remove the extractant. The residue remaining after the removal of the extraction constitutes another form of condensation product which I may employ according to my invention for the separation of wax from oil. This product usually contains from 2% to 10% chlorine and contains only a small quantity of unreacted wax which does not have to be removed from the final product. The reaction temperature between the clorinated wax, naphthalene and aluminum chloride may also be higher than 140° F. For example, in many cases it is desirable to employ a temperature as high as 350° F. or between the range of 250° F. and 350° F. Furthermore, as substitutes for the chlorinated paraffin wax I may also employ chlorinated heavy paraffin oils or various other waxes, such as petrolatum, Montan or ozocerite. Furthermore, instead of using naphthalene I may use diphenyl, chlorinated diphenyl, phenanthracene, anthracene or coal tar residues or highly aromatic oils. The above condensation product is more fully described in the United States patents to MacLaren 1,963,917 and 1,963,918.

The polymerization product shown in Table I, (Item 3) is produced by passing an electric current through a mixture of mineral and vegetable oils. This product is fully described in Kohlenwasserstoffole und Fette, by D. Holde, 7th edition, page 372.

The cracked petroleum pitch shown in Table I (Item 4) is produced from a cracked petroleum residue. The residue is distilled until it has a melting point of about 350 to 400° F. The preferred stock for the production of the cracked pitch is one which contains a relatively large amount of aromatic hydrocarbons. Aromatic gas oil stock which has been recycled through a hydrocarbon conversion or cracking process is an ideal source for this pitch. The cracked gas oil is placed in a still and distilled with fire and steam until a residue is obtained having a melting point (Ball and Ring) of about 350–400° F.

The cracked pitch may also be produced from asphaltic residues in the manner described above.

The naphtha extract from cracked petroleum pitch (Item 5 of Table I) is produced by extracting the aforementioned cracked pitches, having a melting point of 350–400° F. with petroleum naphtha. By petroleum naphtha I mean a light hydrocarbon fraction containing fractions boiling within the gasoline range (i. e. 100–450° F.). The cracked pitch is commingled at ordinary temperature with naphtha in the proportion of one part of pitch to 3 to 5 parts of naphtha. The mixture is then allowed to settle until the insoluble bodies settle to the bottom of the extracting vessel. The naphtha solution is decanted away from the insoluble residue and distilled to remove the naphtha. The extract remaining after the removal of the naphtha is the material shown in Table I as Item 5.

The lubricating oil extract shown in Table I (Item 6) is produced by extracting the cracked pitches, described above, with lubricating oil. The cracked pitch, having a melting point of 350–400° F., is mixed with lubricating oil in the proportion of 1 part of the pitch to 3–5 parts of lubricating oil. This mixture is preferably made at a temperature near or slightly above the melting point of the pitch. The heated mixture is allowed to remain in a quiescent state for 1 to 4 hours at a temperature of about 400° F. in order to allow the insoluble bodies to settle out. The lubricating oil solution is decanted away from the insoluble residue and employed as one of the ingredients of the mixed wax separation aids described herein. The preferred lubricating oil for this purpose is one of the Pennsylvania type having a viscosity of about 300 seconds at 100° F. (Universal Saybolt viscosity). This light paraffinic lubricating oil is capable of dissolving the wax separation aids present in the cracked pitch but does not dissolve an appreciable quantity of bituminous or coke-like bodies present.

The cracked distillate shown in Table I (Item 7) is preferably produced by collecting the overhead fractions produced by distilling the aforementioned cracked pitches having a melting point of about 350–400° F. These heavy distillates consist of fractions which range in character from a heavy viscous liquid to a solid. I have also found that light cracked distillates may also be employed but these lower boiling cracked distillates are not as effective as the heavier distillates.

The wax extract shown in Table I (Item 8) is obtained by extracting wax with acetone. Crude wax obtained from waxy oils are commingled at ordinary temperature with acetone in the proportion of one part of wax to 1 to 3 parts of acetone. The acetone and dissolved fractions are then separated from the undissolved fractions by decantation or filtration. This acetone solution is then distilled for the removal of the acetone and the extract obtained is employed in admixture with the materials shown in Table II as a wax separation aid.

The Montan wax shown in Table II (Item 1) occurs in lignite and is extracted therefrom by means of volatile solvents. Refined Montan wax has a melting point (Ubbelohde) between 80° and 86° C., an acid number of approximately 64 and a saponification number of approximately 67.

Crude or unrefined Montan wax may also be advantageously employed in the mixed wax separation aids produced according to this invention, however this material is not as effective as the refined product. Crude Montan wax has a melting point of about 84° C. (Ubbelohde), an acid number of about 26 and a saponification number of about 92.0.

The I. G. E. wax shown in Table II (Item 2) is believed to be an ester of montanic acid. This wax has an acid number of 14.3, a saponification number of 142 and a melting point of 166° F. (Ubbelohde).

The I. G. S wax shown in Table II (Item 3) is believed to be an ester of montanic acid. This wax has an acid number of 143, a saponification number of 170 and a melting point of 181° F. (Ubbelohde).

The I. G. B. wax shown in Table II (Item 4) is believed to be an ester of montanic acid. This wax has an acid number of 57.8, a saponification number of 148 and a melting point of approximately 177.5° F. (Ubbelohde).

The I. G. O. P. wax shown in Table I (Item 5) is believed to be an ester of montanic acid. This wax has an acid number of 13.8, a saponification number of 113 and a melting point (Ubbelohde) of about 219° F.

In fact all of the I. G. waxes shown in Table II are believed to contain aliphatic esters of montanic acid having relatively high molecular weights.

The acid numbers and saponification numbers of the materials shown in this specification were obtained according to the American Society of Testing Materials, methods D—188—27T and D—94—28, respectively.

The partially oxidized paraffin wax shown in Table II, (Item 13) is produced by introducing or blowing air through paraffin wax at a temperature of about 300–400° F. for a period of about 3 to 5 hours. The partially oxidized hydrocarbons (Item 14, Table II) are produced by blowing air through hydrocarbon or petroleum fractions at a temperature of about 300–400° F. for a period of 2 to 12 hours.

A mixture of the materials shown in Table I with the materials shown in Table II when added to waxy oil is more effective in aiding the separation of wax from oil than the individual materials shown in these tables. For example, the condensation products shown in Table I and the Montan wax shown in Table II aid somewhat in the separation of wax from oil, however I have found that a mixture of Montan wax and the condensation products are greatly more effective as a wax separation aid than either the condensation products or the Montan wax.

Furthermore, the condensation products shown in Table I when mixed with any of I. G. waxes shown in Table II, is decidedly more effective as a wax separation aid than either the condensation products or the I. G. waxes; a mixture of condensation products and stearic acid is more effective as a wax separation aid than either the condensation products or stearic acid; a mixture of cracked petroleum fractions with the I. G. waxes is more effective than either the cracked petroleum fractions or the I. G. waxes; a mixture of cracked petroleum fractions with Montan wax is more effective than either the cracked petroleum fractions or the Montan wax and the condensation products mixed with copal is more effective than either the condensation products or the copal.

In carrying out my invention, a waxy oil is mixed with a small quantity of certain of the materials shown in Table I and a small quantity of certain materials from Table II. This mixture is then cooled to a temperature sufficiently low to precipitate the wax and the wax is then separated from the oil by filtering, centrifuging or settling.

If desired, the waxy oil may be diluted with naphtha, gasoline, or light hydrocarbons such as ethane, propane, butane, pentane, hexane, heptane, octane or nonane or mixtures of these hydrocarbons. Furthermore, I may also dilute the waxy oil with dichlorethylene, trichlorethylene, acetone and benzol, methylethyl-ketone or other ketones or ethers, such as methyl ether, ethyl ether or with alcohols and ethers. To the diluted waxy oil there is then added a small quantity of materials shown in Table I and with materials shown in Table II. The diluted waxy oil containing the mixed wax modifier (materials of Table I mixed with materials from Table II) is then chilled to cause separation of the wax from the diluted oil or oil solution and the wax is then removed by filtration, centrifuging or settling.

The following are specific examples showing the advantages of employing a mixed wax modifier over the use of single wax modifiers and no wax modifiers in the separation of wax from oil. The stock employed in the following examples was a 20 S. A. E. distillate having a pour point of 95° F. (A. S. T. M—D—97-30) an A. P. I. gravity of 22.0, a Saybolt Universal viscosity at 210° F. of 57 seconds and a viscosity gravity constant of 0.864.

The above stock was dissolved in a closed vessel under pressure in liquid propane in the proportion of 4 parts of liquid propane to one part of the waxy stock. The temperature during the solution period was about 110 to 125° F. and the period employed to effect complete solution was about 15 minutes. This solution was externally chilled at the rate of about 3 to 4° F. per minute to a temperature of about −40° F. and then passed through a filter under pressure. The pressure was obtained by superimposing carbon dioxide vapors from a cylinder of liquid carbon dioxide upon the chilled mass in the filter chamber.

The following are the results obtained from the above method of dewaxing:

Filter rate (gallons of viscous oil per square foot of filter surface per hour) =2.42,
Yield of filtered oil (based on charge) =61.4%,
Pour point of dewaxed oil=0° F.

The same experiment was repeated with the addition of 0.27% of the condensation product shown in Table I to the waxy oil with the following results:

Filter rate (gallons of viscous oil per square foot of filter surface per hour) =2.76,
Yield of filtered oil (based on charge) =81.75%,
Pour point of dewaxed oil=15° F.

The same experiment was repeated with the addition of 0.27% Montan wax (Item 1 of Table II) to the waxy oil with the following results:

Filter rate (gallons of viscous oil per square foot of filter surface per hour) =2.45,
Yield of filtered oil (based on charge) =57.7%,
Pour point of dewaxed oil=5° F.

The same experiment was repeated with the addition of 0.135% of the condensation product shown in Table I and with the addition of 0.135% of the Montan wax shown in Table II to the waxy oil with the following results:

Filter rate (gallons of viscous oil per square foot of filter surface per hour) =7.01,
Yield of filtrate (based on charge) =81.35%,
Pour point of dewaxed oil=0° F.

From the above experiments it will be seen that the filter rate obtained when using a mixture of the condensation product and Montan wax as the wax modifier is about three times greater than when the condensation product or the Montan wax is employed alone as the wax modifier. Furthermore, it will be noted that the dewaxed oil obtained when using the mixed wax modifier consisting of the condensation product and Montan wax is lower than the pour point of the oil obtained when the condensation product was used alone as the wax modifier or the Montan wax was used alone as the wax modifier.

In the above experiments the chilling was obtained by external methods. When I employ liquefied normally gaseous hydrocarbons such as propane or ethane as the diluent or normally gaseous ethers I may evaporate a portion of these diluents from the waxy oil under reduced pressure and thereby obtain the necessary refrigeration to chill the oil and precipitate the wax.

The terms "wax separation aids" and "wax modifiers" include the materials shown in Table I and Table II and mixtures of the materials shown in Table I with the materials shown in Table II.

The foregoing examples are merely illustrative and are not to be construed as limitations of the invention which I claim.

I claim:

1. In the art of separating wax from a wax-containing oil, the step of preparing the oil for separation of the wax which comprises adding thereto a condensation product obtained by reacting an aromatic hydrocarbon with a chlorinated aliphatic hydrocarbon in the presence of a metallic halide of the Friedel-Craft catalyst type and one of the members selected from the group of a montanic alcohol ester of montanic acid, carnauba wax, copal, and Montan wax.

2. In the art of separating wax from a wax-containing oil, the step of preparing the oil for the separation of the wax which comprises adding to the waxy oil Montan wax and one of the members selected from the group of cracked petroleum pitch, extract from cracked pitch, cracked petroleum distillate, and a polymerization product obtained by voltalization.

3. In the art of dewaxing a wax-containing oil involving separation of wax from oil, the step of preparing the oil for separation of wax comprising adding thereto a condensation product obtained by reacting an aromatic hydrocarbon with a chlorinated aliphatic hydrocarbon in the presence of a metallic halide of the Friedel-Craft catalyst type and an organic acid.

4. A process for the separation of wax from a wax-bearing oil which comprises adding to said oil a wax separation aid consisting of a condensation product obtained by reacting an aromatic hydrocarbon with a chlorinated aliphatic hydrocarbon in the presence of a metallic halide of the Friedel-Craft catalyst type and a member selected from the group comprising Montan wax, carnauba wax, a montanic alcohol ester of montanic acid and copal, chilling the oil to separate wax and removing the wax from the oil.

5. A process as claimed in claim 4 in which a diluent is added to the waxy oil.

6. A process for the separation of wax from a wax-bearing oil which comprises adding to said oil Montan wax and a member selected from the group of cracked pitch, extract from cracked pitch, cracked petroleum distillate and a polymerization product obtained by volatilization, chilling the mixture to separate wax and removing the wax from the chilled oil.

7. A method for the separation of wax from a wax-bearing oil which comprises mixing said oil with a small quantity of Montan wax and a condensation product obtained by reacting an aromatic hydrocarbon with a chlorinated aliphatic hydrocarbon in the presence of a metallic halide of the Friedel-Craft catalyst type, chilling the mixture to separate wax and removing the wax from the chilled mixture.

8. A method according to claim 7 in which the wax is removed from the chilled mixture by filtration.

9. A method according to claim 7 in which a diluent is added to the wax-bearing oil.

10. A method for the separation of wax from a wax bearing oil which comprises diluting said oil with a liquefied normally gaseous hydrocarbon, adding to said wax bearing oil Montan wax and a condensation product produced by reacting an aromatic hydrocarbon with a chlorinated aliphatic hydrocarbon in the presence of a metallic halide of the Friedel-Craft catalyst type and chilling the diluted oil to separate wax and removing the wax from the chilled oil.

11. A method according to claim 10 in which the diluent is liquid propane and the chilling is obtained by vaporizing a portion of the propane from the diluted oil.

MANER L. WADE.